US012605701B2

(12) United States Patent
Obata et al.

(10) Patent No.: US 12,605,701 B2
(45) Date of Patent: Apr. 21, 2026

(54) METHOD OF FORMING CATALYST LAYER

(71) Applicant: KABUSHIKI KAISHA TOSHIBA, Tokyo (JP)

(72) Inventors: Susumu Obata, Yokohama (JP); Mitsuo Sano, Kamakura (JP); Keiichiro Matsuo, Yokohama (JP); Kazuhito Higuchi, Yokohama (JP); Kazuo Shimokawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 758 days.

(21) Appl. No.: 17/201,361

(22) Filed: Mar. 15, 2021

(65) Prior Publication Data

US 2021/0299648 A1 Sep. 30, 2021

(30) Foreign Application Priority Data

Mar. 24, 2020 (JP) ................................. 2020-052021

(51) Int. Cl.
| | |
|---|---|
| B01J 37/02 | (2006.01) |
| B01J 23/42 | (2006.01) |
| B01J 23/44 | (2006.01) |
| B01J 23/50 | (2006.01) |
| B01J 23/52 | (2006.01) |
| B01J 35/31 | (2024.01) |

(52) U.S. Cl.
CPC ........... B01J 37/0217 (2013.01); B01J 23/42 (2013.01); B01J 23/44 (2013.01); B01J 23/50 (2013.01); B01J 23/52 (2013.01); B01J 35/31 (2024.01); B01J 2235/00 (2024.01)

(58) Field of Classification Search
None
See application file for complete search history.

(56) References Cited

U.S. PATENT DOCUMENTS

| | | |
|---|---|---|
| 2004/0137161 A1 | 7/2004 | Segawa et al. |
| 2007/0148653 A1 | 6/2007 | Yoshida |
| 2008/0020923 A1 | 1/2008 | Debe et al. |
| 2015/0050556 A1 | 2/2015 | Liu et al. |

FOREIGN PATENT DOCUMENTS

| | | |
|---|---|---|
| CA | 2 308 302 A1 | 5/1999 |
| JP | 2007-98563 A | 4/2007 |
| JP | 2009-509776 A | 3/2009 |
| JP | 5322173 B2 | 10/2013 |

(Continued)

OTHER PUBLICATIONS

Feng et al., Lithography-free silicon micro-pillars as catalyst supports for microfabricated fuel cell applications, Electrochemistry Communications, 2006, 8, 1235-1238 (Year: 2006).*

(Continued)

*Primary Examiner* — Keling Zhang
(74) *Attorney, Agent, or Firm* — Oblon, McClelland, Maier & Neustadt, L.L.P.

(57) ABSTRACT

According to an embodiment, a method of forming a catalyst layer includes performing displacement plating on a substrate having a surface that is made of a semiconductor and includes a plurality of projections, thereby depositing a catalytic metal at positions of the plurality of projections.

7 Claims, 3 Drawing Sheets

(56)  References Cited

FOREIGN PATENT DOCUMENTS

| JP | 2015-514310 A | 5/2015 |
| JP | 5841121 B2 | 1/2016 |
| JP | 6028969 B2 | 11/2016 |
| JP | 6246956 B1 | 12/2017 |
| TW | 565895 B | 12/2003 |
| WO | WO 2012/110875 A2 | 8/2012 |
| WO | WO 2014/192891 A1 | 12/2014 |

OTHER PUBLICATIONS

Harraz et al., Metal deposition onto a porous silicon layer by immersion plating from aqueous and nonaqueous solutions, Journal of the electrochemical Society, 149, C456-C463, 2002 (Year: 2002).*

Huang et al., Metal-assisted chemical etching of silicon: A review, Adv. Mater., 2011, 23, 285-308 (Year: 2011).*

Yae et al., Nucleation behavior in electroless displacement deposition of metals on silicon from hydrofluoric acid solution, Electrochimica Acta 53, 2007 (Year: 2007).*

* cited by examiner

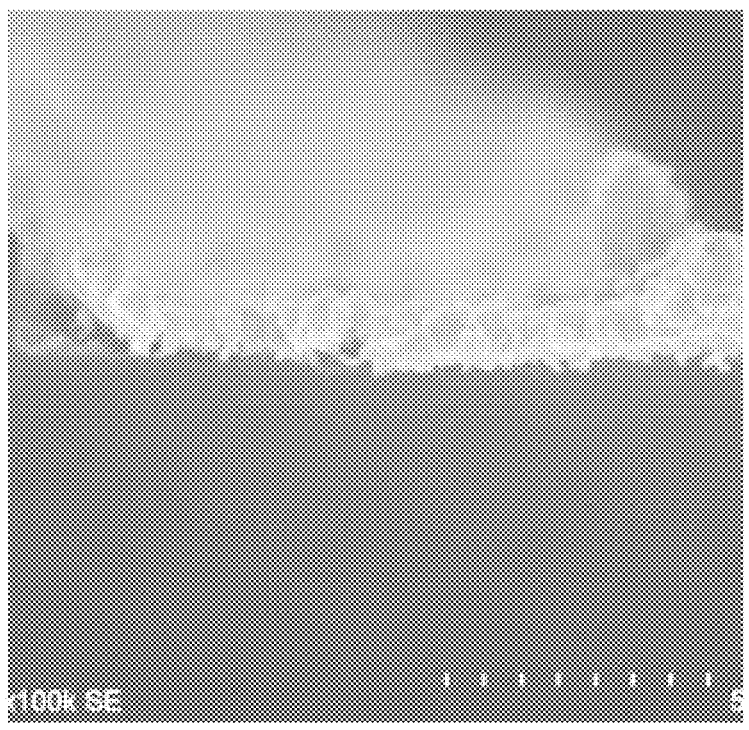
F I G. 5
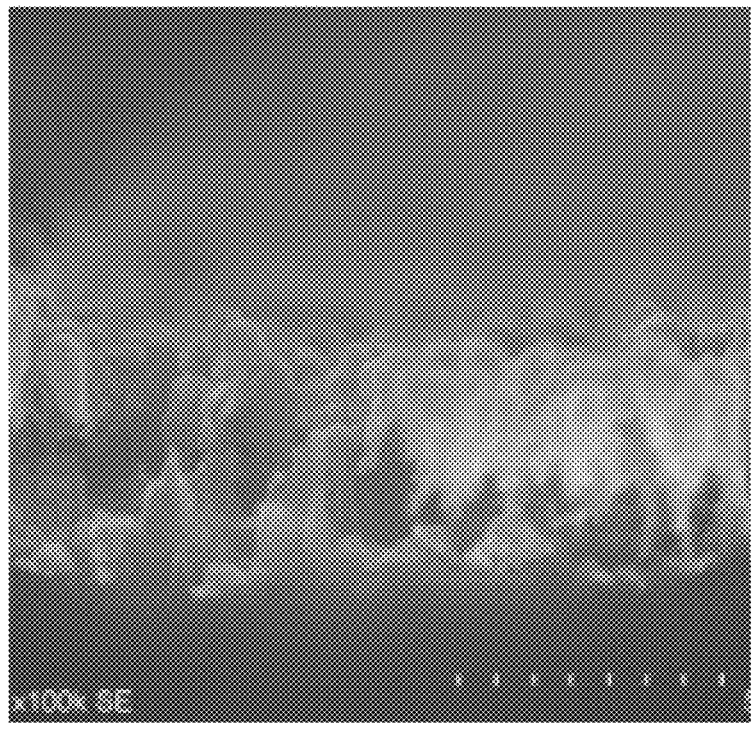
F I G. 6

METHOD OF FORMING CATALYST LAYER

CROSS-REFERENCE TO RELATED APPLICATIONS

This application is based upon and claims the benefit of priority from Japanese Patent Applications No. 2020-052021, filed Mar. 24, 2020, the entire contents of which are incorporated herein by reference.

FIELD

Embodiments described herein relate generally to a method of forming a catalyst layer.

BACKGROUND

Metals such as noble metals are used as catalytic metals in various articles such as catalysts for fuel cells or for exhaust gas purification. Since metals used as catalytic metals are generally expensive, it is desirable that the catalytic metals have a large specific surface area.

BRIEF DESCRIPTION OF THE DRAWINGS

FIG. 5 is an electron micrograph of a catalyst layer obtained in Test 1; and FIG. 6 is an electron micrograph of a catalyst layer obtained in Test 2.

DETAILED DESCRIPTION

Figure 1:
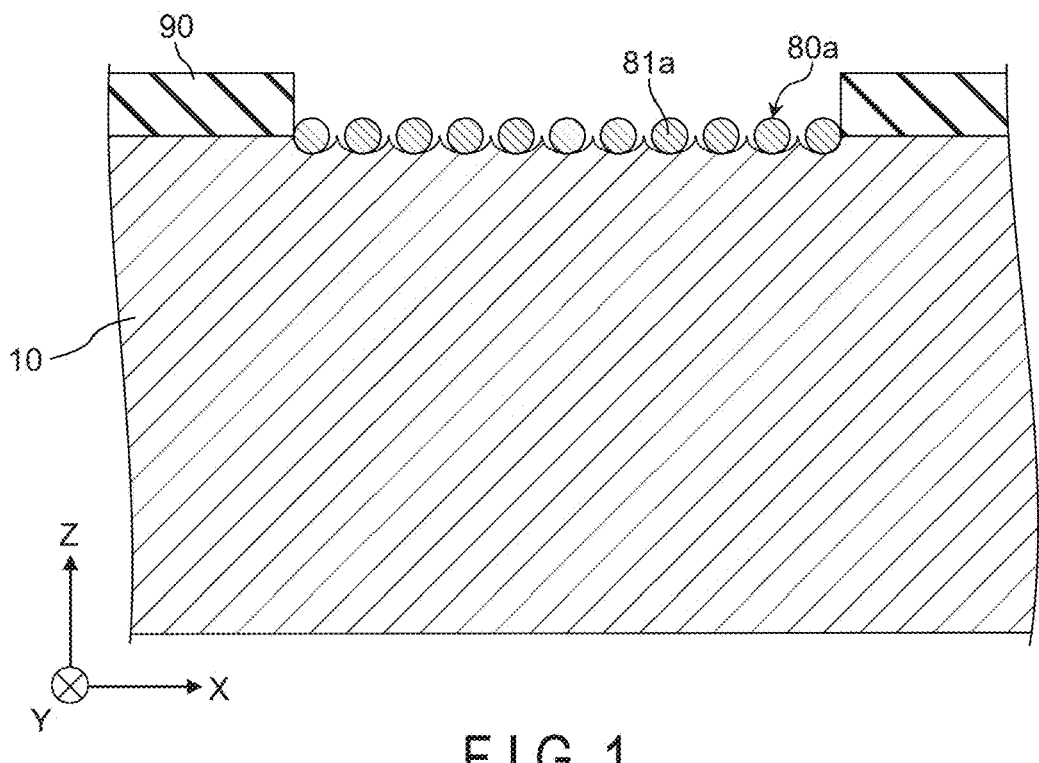
FIG. 1 is a cross-sectional view showing a structure obtained by a first catalyst layer formation step in a method of forming a catalyst layer according to an embodiment.

A method of forming a catalyst layer according to an embodiment comprises performing displacement plating on a substrate comprising a surface that is made of a semiconductor and comprises a plurality of projections, thereby depositing a catalytic metal at positions of the plurality of projections.

Hereinafter, embodiments will be described in detail with reference to the accompanying drawings. Constituents which achieve the same or similar functions are denoted by the same reference numerals throughout the drawings, and repetitive descriptions will be omitted.

In a method of forming a catalyst layer according to an embodiment, a substrate having a surface that is made of a semiconductor and has a plurality of projections is prepared. Such a substrate is obtained by, for example, the method described below.

First, a structure shown in FIG. 1 is prepared. The structure shown in FIG. 1 includes a substrate 10, a mask layer 90, and a layer 80a.

The substrate 10 is a substrate including a semiconductor material such as silicon. The substrate 10 may have any shape. In the present embodiment, the substrate 10 is, for example, a single-crystal silicon wafer. A plane orientation of the single-crystal silicon wafer is not particularly limited; however, a silicon wafer whose main surface is a (100) plane is used in the present embodiment. A silicon wafer whose main surface is a (110) plane can also be used as the substrate 10.

The mask layer 90 is provided on one of the main surfaces (hereinafter referred to as a "first surface") of the substrate 10. The mask layer 90 includes one or more openings. The mask layer 90 prevents a noble metal from coming into contact with a region of the first surface of the substrate 10 that is covered with the mask layer 90.

Examples of the material of the mask layer 90 include organic materials such as polyimide, fluororesin, phenol resin, acrylic resin, and novolac resin, and inorganic materials such as silicon oxide and silicon nitride.

The mask layer 90 may be formed by, for example, an existing semiconductor process. The mask layer 90 made of an organic material may be formed by, for example, photolithography. The mask layer 90 made of an inorganic material may be formed by, for example, formation of an inorganic material layer by a vapor deposition method, formation of a mask by photolithography, and patterning of the inorganic material layer by etching. Alternatively, the mask layer 90 made of an inorganic material may be formed by oxidation or nitration of the surface region of the substrate 10, formation of a mask by photolithography, and patterning of an oxide or nitride layer by etching. The mask layer 90 may be omitted.

The layer 80a is provided on a region of the first surface of the substrate 10 that is not covered with the mask layer 90. The layer 80a is a particulate layer formed of catalytic metal particles 81a. The layer 80a includes gaps among the catalytic metal particles 81a.

The catalytic metal particle 81a includes, as a catalytic metal, a metal more noble than the aforementioned semiconductor material, such as a noble metal. The noble metal is, for example, one or more of gold, silver, platinum, rhodium, palladium, and ruthenium. The layer 80a and the catalytic metal particles 81a may further include a metal other than a noble metal such as titanium. The layer 80a and the catalytic metal particles 81a preferably include one or more of gold, silver, platinum, and, palladium.

The layer 80a can be formed by, for example, electroplating, reduction plating, or displacement plating. The layer 80a may be formed by application of a dispersion containing noble metal particles, or vapor deposition such as evaporation or sputtering. Among these methods, the displacement plating is particularly favorable because it is possible to directly and evenly deposit the catalytic metal on the region of the first surface of the substrate 10 that is not covered with the mask layer 90. As one example of forming the layer 80a, formation of the layer 80a by displacement plating will be described below.

The displacement plating for forming the layer 80a formed of the catalytic metal particles 81a is performed on the substrate 10 with a flat surface made of a semiconductor in at least the position of the opening of the mask layer 90. Thereby, a layer formed of a plurality of catalytic metal particles 81a is formed on the flat surface so as to have gaps among the catalytic metal particles 81a.

For the deposition of the catalytic metal by displacement plating, it is possible to use, for example, an aqueous solution of potassium tetrachloroaurate (III), an aqueous solution of gold sulfite, or an aqueous solution of potassium gold cyanide (I). A description will be given below assuming that the catalytic metal is gold.

The displacement plating solution is, for example, a mixture of an aqueous solution of potassium tetrachloroaurate (III) and hydrofluoric acid. The hydrofluoric acid has a function of removing a native oxide film from the surface of the substrate 10.

The displacement plating solution may further include at least one of a complexing agent and a pH buffer. The complexing agent has a function of stabilizing noble metal ions included in the displacement plating solution. The pH buffer has a function of stabilizing the reaction rate of the plating. For example, glycine, citric acid, carboxylate ions, cyanide ions, pyrophosphate ions, ethylenediaminetetraacetate, ammonia, aminocarboxylate ions, acetic acid, lactic acid, phosphate, boric acid, or a combination of two or more thereof can be used as these additives. Glycine and citric acid are preferably used as the additives.

The concentration of potassium tetrachloroaurate (III) in the displacement plating solution is preferably in a range of 0.0001 mol/L to 0.01 mol/L, and more preferably in a range of 0.0005 mol/L to 0.005 mol/L. When the concentration of potassium tetrachloroaurate (III) is low, it is difficult to obtain a catalyst layer 80 in which catalytic metal particles 81a having a sufficient size are distributed at a low density. When the concentration of potassium tetrachloroaurate (III) is high, the catalytic metal particles 81a are stacked in multiple layers, which may generate a dendrite.

The concentration of hydrogen fluoride in the displacement plating solution is preferably in a range of 0.01 mol/L to 5 mol/L, and more preferably in a range of 0.5 mol/L to 2 mol/L. When the concentration of hydrogen fluoride is low, it is difficult to obtain a layer 80a in which catalytic metal particles 81a having a sufficient size are distributed at a low density. When the concentration of hydrogen fluoride is high, dissolution of the semiconductor surface proceeds, which may adversely affect etching.

The concentration of glycine in the displacement plating solution is preferably in a range of 0.1 g/L to 20 g/L and more preferably in a range of 1 g/L to 10 g/L. When the concentration of glycine is excessively reduced, the displacement plating solution becomes unstable, and the catalytic metal particles 81a are stacked in multiple layers, which may generate a dendrite. When the concentration of glycine is excessively increased, it becomes difficult to obtain a layer 80a in which catalytic metal particles 81a having a sufficient size are distributed at a low density.

The concentration of citric acid in the displacement plating solution is preferably in a range of 0.1 g/L to 20 g/L and more preferably in a range of 1 g/L to 10 g/L. When the concentration of citric acid is excessively reduced, the displacement plating solution becomes unstable, and the catalytic metal particles 81a are stacked in multiple layers, which may generate a dendrite. When the concentration of citric acid is excessively increased, it becomes difficult to obtain a layer 80a in which catalytic metal particles 81a having a sufficient size are distributed at a low density.

Instead of glycine and citric acid, additives having the same function as that of glycine and citric acid may be used. For example, carboxylate ions, cyanide ions, pyrophosphate ions, ethylenediaminetetraacetate, ammonia, or aminocarboxylate ions may be used instead of glycine. For example, carboxylate ions, acetic acid, lactic acid, phosphate, or boric acid may be used instead of citric acid.

When the substrate 10 is immersed in the displacement plating solution, a native oxide film is removed from the first surface of the substrate 10, and a catalytic metal (gold in this example) is deposited on the region of the first surface of the substrate 10 that is not covered with the mask layer 90. Thus, the layer 80a formed of catalytic metal particles 81a is obtained. Although the first surface of the substrate 10 is originally flat, it is slightly recessed at the positions of the catalytic metal particles 81a and near the catalytic metal particles 81a due to the displacement plating.

Next, the semiconductor is etched at the positions of the catalytic metal particles 81a using the catalytic metal particles 81a as catalysts. Thereby, a plurality of projections are formed at the positions of the gaps among the catalytic metal particles 81a.

Figure 2:
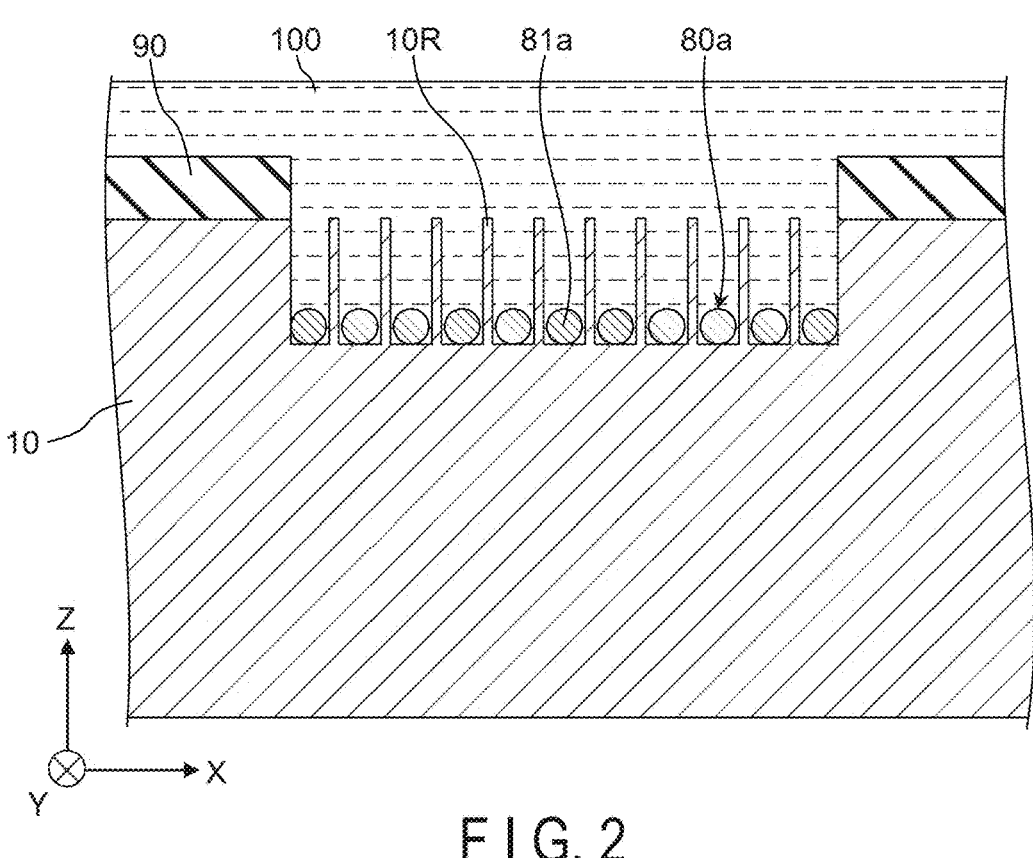
FIG. 2 is a cross-sectional view showing an etching step in the method of forming a catalyst layer according to the embodiment.

Specifically, the substrate 10 is etched with an etching agent 100, as shown in FIG. 2. For example, the substrate 10 is immersed in the etching agent 100 in a liquid form to bring the etching agent 100 into contact with the substrate 10.

The etching agent 100 contains an oxidizer and hydrogen fluoride.

The concentration of hydrogen fluoride in the etching agent 100 is preferably in a range of 1 mol/L to 20 mol/L, more preferably in a range of 5 mol/L to 10 mol/L, and still more preferably in a range of 3 mol/L to 7 mol/L. When the concentration of hydrogen fluoride is low, it is difficult to achieve a high etching rate. When the concentration of hydrogen fluoride is high, excess side etching may occur.

The oxidizer can be selected from, for example, hydrogen peroxide, nitric acid, $AgNO_3$, $KAuCl_4$, $HAuCl_4$, $K_2PtCl_6$, $H_2PtCl_6$, $Fe(NO_3)_3$, $Ni(NO_3)_2$, $Mg(NO_3)_2$, $Na_2S_2O_8$, $K_2S_2O_8$, $KMnO_4$ and $K_2Cr_2O_7$. Hydrogen peroxide is preferred as the oxidizer because it does not produce a harmful byproduct.

The concentration of the oxidizer in the etching agent 100 is preferably in a range of 0.2 mol/L to 8 mol/L, more preferably in a range of 2 mol/L to 4 mol/L, and still more preferably in a range of 3 mol/L to 4 mol/L.

The etching agent 100 may further contain a buffer. The buffer includes, for example, at least one of ammonium fluoride and ammonia. As an example, the buffer is ammonium fluoride. As another example, the buffer is a mixture of ammonium fluoride and ammonia.

The etching agent 100 may further contain other components such as water.

When such an etching agent 100 is used, the material of the substrate 10 (silicon in this example) is oxidized only in the regions of the substrate 10 that are close to the catalytic metal particles 81a. An oxide thus generated is dissolved and removed by hydrofluoric acid. Therefore, only the portions close to the catalytic metal particles 81a are selectively etched.

The catalytic metal particles 81a move toward the other main surface (hereinafter, referred to as a "second surface") of the substrate 10 with the progress of etching, where etching similar to the above is performed. As a result, etching proceeds from the first surface toward the second surface at the position of the layer 80a in a direction perpendicular to the first surface, as shown in FIG. 2.

Figure 3:
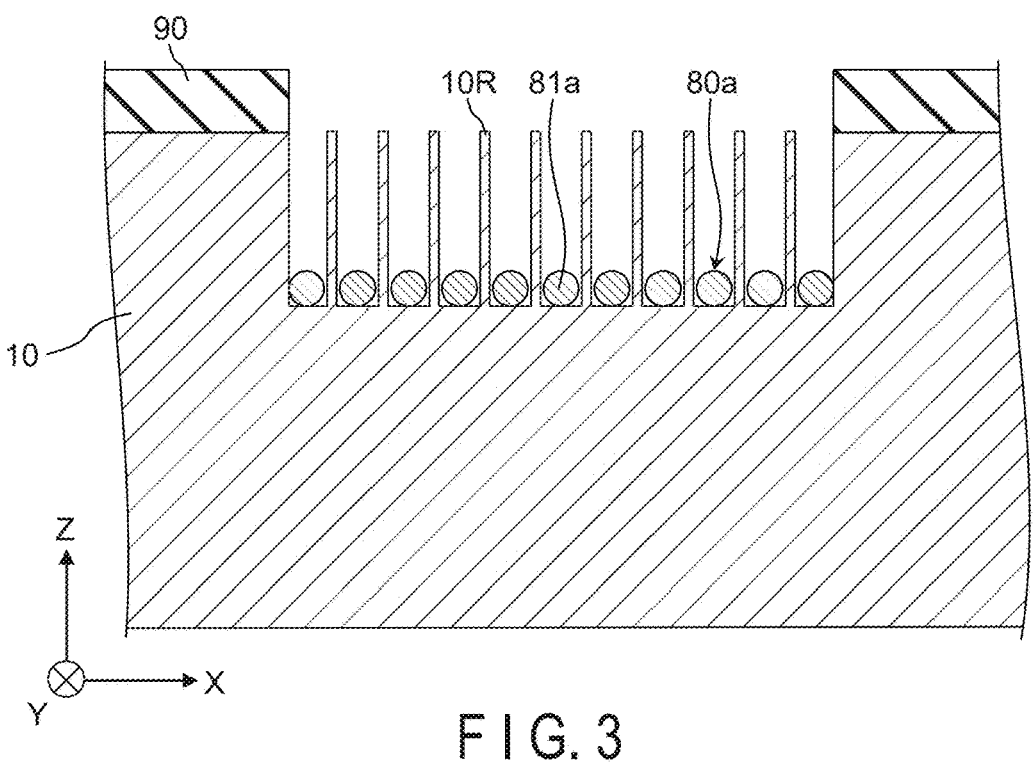
FIG. 3 is a cross-sectional view showing a structure obtained by the step shown in FIG. 2.

However, since the layer 80a includes gaps among the catalytic metal particles 81a, etching does not proceed at the positions corresponding to these gaps. As a result, needle-shaped projections 10R each extending in a direction intersecting with the first surface, in particular, in the depth direction of a recess, are generated as etching residues on the bottom portion of the recess, as shown in FIGS. 2 and 3.

Through the above process, a substrate 10 having a surface that is made of a semiconductor and includes a plurality of projections 10R is obtained.

Next, displacement plating is performed on the substrate 10 to deposit a catalytic metal at the positions of the projections 10R. Thereby, a layer 80b formed of a plurality of catalytic metal particles 81b is formed.

The displacement plating for forming the layer 80b can be performed by, for example, a process similar to that described above for the layer 80a. However, the displacement plating for forming the layer 80b is preferably performed so as to deposit a larger amount of catalytic metal, as compared to the displacement plating for forming the layer 80a. Namely, the amount of catalytic metal deposited after etching is preferably larger than the amount of catalytic metal in the layer 80a formed before etching.

Since the projections 10R have a needle shape, the displacement plating proceeds at almost the entirety of the projections 10R. Thus, the catalytic metal is deposited in particulate form extending in the direction intersecting with the first surface so as to correspond to the shape of the projections 10R. Namely, a layer 80b formed of catalytic metal particles 81b having a shape extending in the depth direction of the recess is obtained by the above-described displacement plating.

Figure 4:
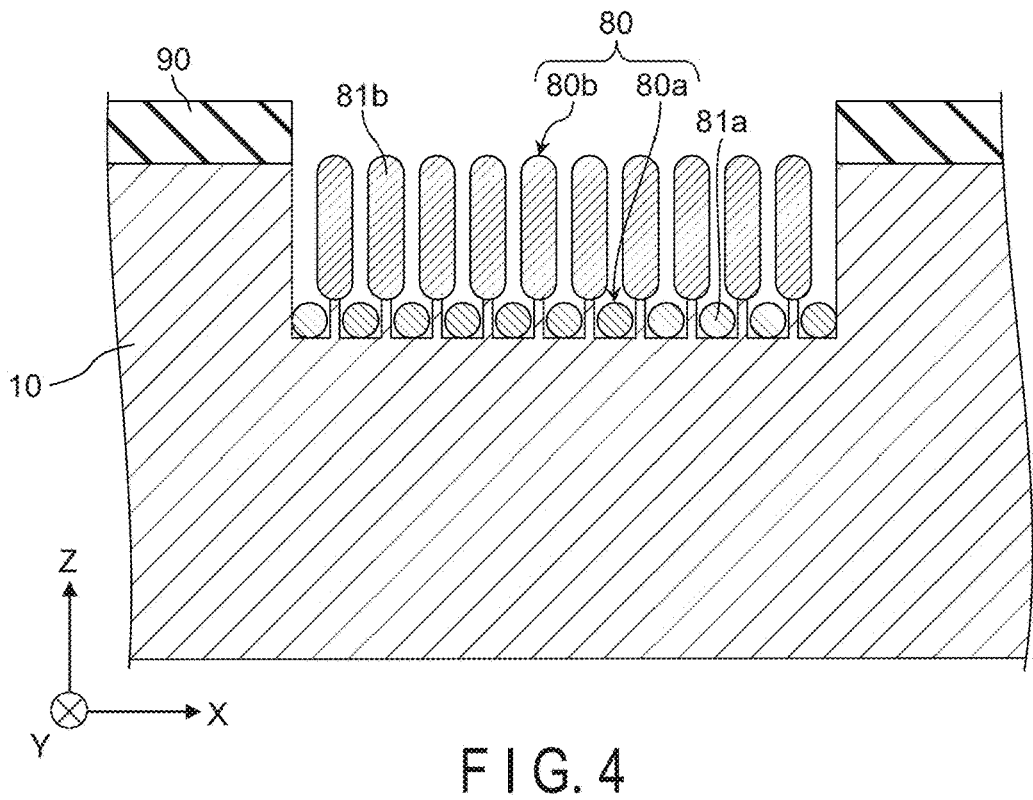
FIG. 4 is a cross-sectional view showing a structure obtained by a second catalyst layer formation step in the method of forming a catalyst layer according to the embodiment.

Through the above process, a catalyst layer 80 including the layer 80a and the layer 80b is obtained. FIGS. 1 to 4 illustrate a simplified structure for ease of understanding. In reality, the catalytic metal particles 81a may be connected to one another, and the catalytic metal particles 81b may be connected to one another in the plate processing performed to generate the catalytic metal particles 81b. Also, the catalytic metal particles 81a and the catalytic metal particles 81b may be connected to each other in the plate processing performed to generate the catalytic metal particles 81b. Thus, the catalyst layer 80 does not necessarily have a structure that can clearly distinguish the two layers as shown in FIG. 4.

In the above method, displacement plating is performed on the substrate 10 with the first surface including the plurality of projections 10R to deposit a catalytic metal at the positions of the projections 10R. Since the layer 80b thus obtained is formed by depositing a catalytic metal at the positions of the projections 10R, a ratio of the surface area of the catalytic metal to an apparent area is large. Namely, the catalyst layer 80 including the layer 80b has a large ratio of the surface area of the catalytic metal to an apparent area.

Also, the catalyst layer 80 has a multi-layer structure including the layer 80a and the layer 80b. The multi-layer structure also contributes to an increase in the ratio of the surface area of the catalytic metal to an apparent area.

Furthermore, the catalytic metal particles 81b have a shape extending in the depth direction of the recess, as described above. This structure also contributes to an increase in the ratio of the surface area of the catalytic metal to an apparent area.

The catalyst layer 80 can be utilized to, for example, promote a reaction between substances in a gas phase or a liquid phase. The catalyst layer 80 may also be used to further etch the substrate 10. Said etching can be performed by, for example, the same method as described above for the formation of the projections 10R. For example, a deeper recess or through-hole can be formed in the substrate 10 by the etching.

In the above method, the composition of the plating solution may be constant throughout the reaction in each displacement plating step. Alternatively, the composition of the plating solution may be changed in the middle of the reaction in at least one of the displacement plating steps. In the above-described etching, the composition of the etching agent may be constant throughout the reaction or changed in the middle of the reaction.

The catalytic metal particles 81b adjacent to one another may be spaced apart from one another, as shown in FIG. 4. Alternatively, the catalytic metal particles 81b adjacent to one another may be in contact with one another as long as the layer 80b includes gaps among the catalytic metal particles 81b.

In the above method, the layer 80a is formed to have a thickness preferably in a range of 1 nm to 100 nm and more preferably in a range of 5 nm to 50 nm. Also, the layer 80a is formed so that the catalytic metal particles 81a have an average particle diameter preferably in a range of 1 nm to 100 nm and more preferably in a range of 5 nm to 50 nm. When the average particle diameter of the catalytic metal particles 81a and the thickness of the layer 80a are in the above range, projections 10R having a sufficient diameter or width can be generated at a high density.

Herein, the "average particle diameter" of the catalytic metal particles 81a is a value obtained by the method described below. First, an image of a cross section of the layer 80a is captured with an electron microscope. Next, the areas of the catalytic metal particles 81a obtained from the image are subjected to arithmetic averaging. A diameter of a circle having an area equal to the average area is set as an average particle diameter of the catalytic metal particles 81a.

An average distance between the centers of the adjacent projections 10R is preferably in a range of 3 nm to 200 nm and more preferably in a range of 10 nm to 100 nm. When the average center-to-center distance is increased, the distance between the centers of the catalytic metal particles 81b is also increased. Therefore, in view of obtaining a catalyst layer 80 having a large surface area of the catalytic metal relative to an apparent area, the average center-to-center distance is preferably small. However, when the average center-to-center distance is excessively reduced, the contact area between the adjacent catalytic metal particles 81b is increased, which may result in a layer 80b without gaps among the catalytic metal particles 81b.

The height of the projections 10R is preferably in a range of 50 nm to 300 nm and more preferably in a range of 100 nm to 200 nm. When the height of the projections 10R is excessively reduced, the gaps among the catalytic metal particles 81a are easily filled with the catalytic metal particles 81b. When the height of the projections 10R is excessively increased, the projections 10R are easily destroyed.

A ratio of the height of the projections 10R to the diameter or width of the projections 10R is preferably in a range of 1 to 10 and more preferably in a range of 3 to 6. When said ratio is excessively reduced, the gaps among the catalytic metal particles 81a are easily filled with the catalytic metal particles 81b. When said ratio is excessively increased, the projections 10R are easily destroyed.

The layer 80b is formed to have a thickness preferably in a range of 10 nm to 300 nm and more preferably in a range of 100 nm to 200 nm. Also, the layer 80b is formed so that the catalytic metal particles 81b have an average diameter or an average width preferably in a range of 10 nm to 200 nm and more preferably in a range of 20 nm to 100 nm. In general, the layer 80b having an average diameter or average width of the catalytic metal particles 81b and a thickness of the layer 80b in the above range has a large ratio of the surface area of the catalytic metal to an apparent area.

Herein, the "average diameter" or "average width" of the catalytic metal particles 81b is a value obtained by the method described below. First, an image of a cross section of the layer 80b is captured with an electron microscope. Next, the areas of the catalytic metal particles 81b obtained from the image are subjected to arithmetic averaging. A value obtained by dividing the average area by the thickness of the layer 80b is set as the average diameter or average width of the catalytic metal particles 81b.

The catalyst layer 80 is formed to have a density preferably in a range of 20 μg/cm² to 200 μg/cm² and more preferably in a range of 40 μg/cm² to 80 μg/cm². When the density of the catalyst layer 80 is excessively reduced, it may become difficult to make the ratio of the surface area of the catalytic metal to an apparent area sufficiently large. When the density of the catalyst layer 80 is excessively increased, there are fewer gaps among the catalytic metal particles, which may make it difficult to make the ratio of the surface area of the catalytic metal to an apparent area sufficiently large.

A proportion of the amount of the catalytic metal deposited by the displacement plating after the etching in the total amount of the catalytic metal deposited by the displacement plating before and after the etching is preferably in a range of 10% by mass to 90% by mass and more preferably greater than 50% by mass. The proportion may be in a range of 30% by mass to 50% by mass. When said proportion is excessively reduced, it becomes difficult to generate a sufficient number of projections 10R or it becomes difficult to make the displacement plating sufficiently proceed at the projections 10R, which may make it difficult to make the ratio of the surface area of the catalytic metal to an apparent area sufficiently large. When said proportion is excessively increased, there are fewer gaps among the catalytic metal particles, which may make it difficult to make the ratio of the surface area of the catalytic metal to an apparent area sufficiently large.

In the present embodiment, the method of forming the needle-shaped projections 10R is described; however, the projections 10R may have other shapes. For example, the projections 10R may have a flat-plate shape and be arranged in the thickness direction so as to be spaced apart from each other.

Test examples will be described below.

Test 1

In Test 1, a catalyst layer was formed on a silicon wafer by the method described below for the purpose of comparing it to a catalyst layer of Test 2 described later.

First, a silicon wafer whose main surface was a (100) plane was prepared.

Next, a mask layer with an opening was formed on the aforementioned main surface of the silicon wafer. The mask layer was formed by photolithography using a photoresist.

Then, a displacement plating solution was prepared by mixing an aqueous solution of potassium tetrachloroaurate (III) and hydrofluoric acid. In the displacement plating solution, the concentration of potassium tetrachloroaurate (III) was 0.003 mmol/L and the concentration of hydrogen fluoride was 1 mol/L.

The temperature of the displacement plating solution was adjusted to 20° C., and the silicon wafer on which the mask layer was formed was immersed in the displacement plating solution for three minutes. Thus, a catalyst layer was formed on the silicon wafer.

Test 2

In Test 2, a catalyst layer 80 was formed on a substrate 10 by the method described with reference to FIGS. 1 to 4.

In this test, the same silicon wafer as that of Test 1 was used as the substrate 10. A mask layer 90 was formed by the same method as that performed in Test 1.

A displacement plating solution for forming a layer 80a was prepared by mixing an aqueous solution of potassium tetrachloroaurate (III) and hydrofluoric acid. In the displacement plating solution, the concentration of potassium tetrachloroaurate (III) was 0.0005 mmol/L and the concentration of hydrogen fluoride was 1 mol/L. The temperature of the displacement plating solution was adjusted to 20° C., and the substrate 10 on which the mask layer 90 was formed was immersed in the displacement plating solution for 90 seconds, thereby forming the layer 80a.

Then, an etching agent was prepared by mixing hydrofluoric acid and hydrogen peroxide. In this etching agent, the concentration of hydrogen fluoride was 3.8 mol/L and the concentration of hydrogen peroxide was 0.5 mol/L. The temperature of the etching agent was adjusted to 20° C., and the substrate 10 on which the mask layer 90 and the layer 80a were formed was immersed in the etching agent for 75 seconds and etched. Thus, projections 10R were formed.

Thereafter, a layer 80b was formed. A displacement plating solution for forming the layer 80b was prepared by mixing an aqueous solution of potassium tetrachloroaurate (III) and hydrofluoric acid. In the displacement plating solution, the concentration of potassium tetrachloroaurate (III) was 0.003 mmol/L and the concentration of hydrogen fluoride was 1 mol/L. The temperature of the displacement plating solution was adjusted to 20° C., and the substrate 10 on which the mask layer 90, the layer 80a, and the projections 10R were formed was immersed in the displacement plating solution for three minutes, thereby forming the layer 80b.

Evaluation

Images of the cross sections of the structures obtained in Tests 1 and 2 were captured.

FIGS. 5 and 6 are electron micrographs of the catalyst layers obtained in Tests 1 and 2, respectively. In the catalyst layer obtained when plate processing was performed only once, that is, the catalyst layer obtained in Test 1, the height and width of the catalytic metal particles were nearly equal, as shown in FIG. 5. On the other hand, in the catalyst layer obtained when plate processing, etching, and plate processing were performed in this order, that is, the catalyst layer obtained in Test 2, the catalytic metal particles at the lower part of the catalyst layer had a diameter or width nearly equal to the diameter of the catalytic metal particles of the catalyst layer obtained in Test 1, as shown in FIG. 6. However, in the catalyst layer obtained in Test 2, the catalytic metal particles at the upper part of the catalyst layer had a shape extending in the thickness direction of the catalyst layer. Namely, the catalyst layer obtained in Test 2 had a larger ratio of the surface area of the catalytic metal to an apparent area than that of the catalyst layer obtained in Test 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A method of forming a catalyst layer, comprising performing displacement plating using a displacement plating solution on a substrate comprising a surface that is made of a semiconductor and comprises a plurality of projections, thereby depositing a catalytic metal on each of the plurality of projections, wherein the displacement plating solution contains potassium tetrachloroaurate (III) and hydrofluoric acid, each projection of the plurality of projections having a needle shape extending in a direction intersecting with the surface, and the catalytic metal is deposited in particulate form extending in the direction so as to correspond to the needle shape of said each projection.

2. The method according to claim 1, wherein the plurality of projections have a height in a range of 50 nm to 300 nm.

3. The method according to claim 1, wherein an average distance between centers of the projections adjacent to each other is in a range of 10 nm to 100 nm.

4. The method according to claim 1, further comprising:

performing displacement plating on a substrate comprising a flat surface made of the semiconductor, thereby forming a layer formed of a plurality of catalytic metal particles on the flat surface with gaps provided among the plurality of catalytic metal particles; and etching the semiconductor at positions of the plurality of catalytic metal particles using the plurality of catalytic metal particles as catalysts, thereby forming the plurality of projections at positions of the gaps.

5. The method according to claim 4, wherein an amount of the catalytic metal deposited after the etching is larger than an amount of the plurality of catalytic metal particles in the layer formed before the etching.

6. The method according to claim 1, wherein the catalyst layer is formed at a density in a range of 20 $\mu g/cm^2$ to 200 $\mu g/cm^2$.

7. The method according to claim 1, wherein the semiconductor comprises silicon and the catalyst layer comprises gold.

* * * * *